United States Patent Office 3,201,337
Patented Aug. 17, 1965

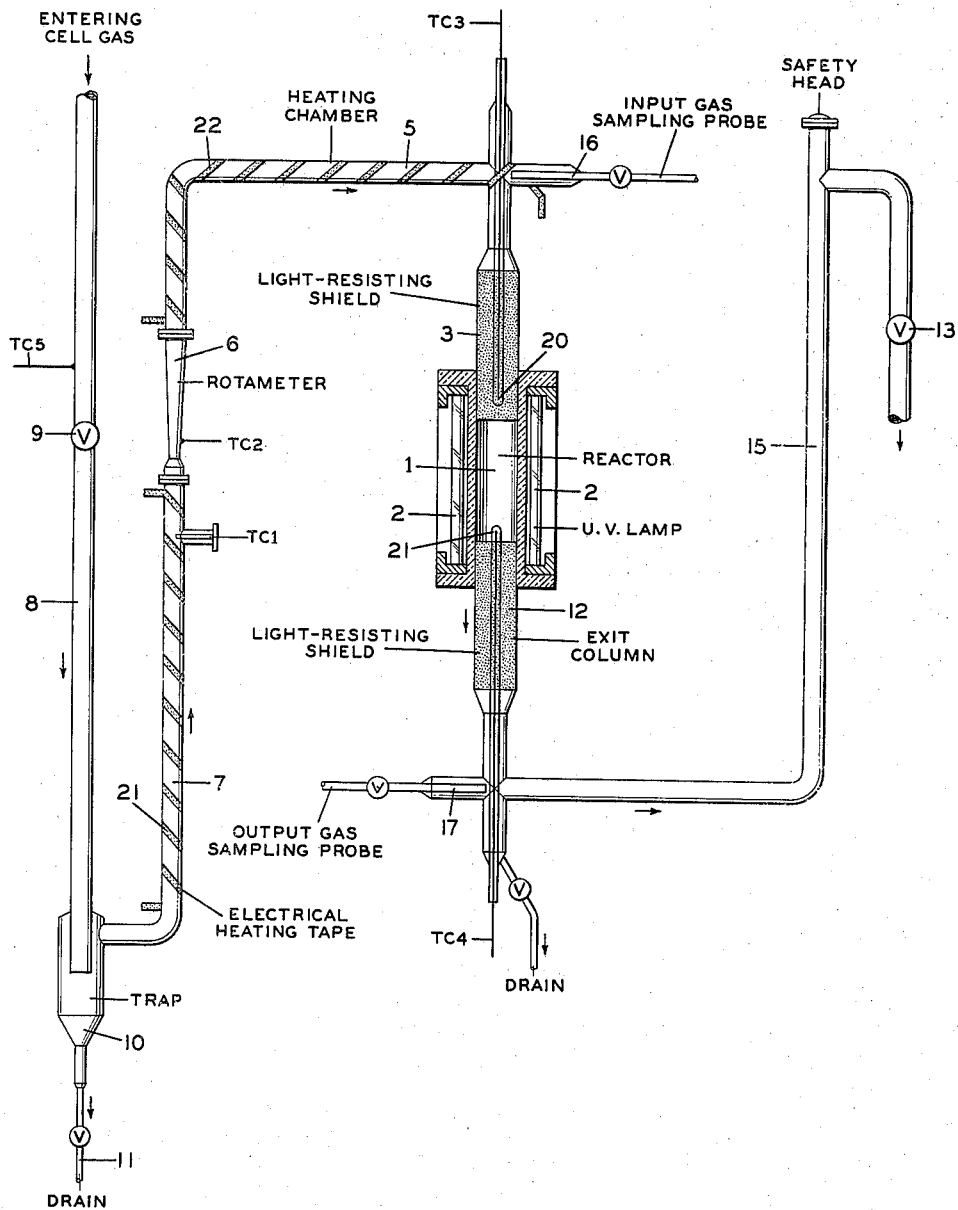

3,201,337
PROCESS FOR REMOVING HYDROGEN FROM CHLORINE GAS
William C. Eichelberger, Syracuse, and Winslow H. Hartford, Fayetteville, Manlius, N.Y., assignors to Allied Chemical Corporation, New York, N.Y., a corporation of New York
Filed May 12, 1961, Ser. No. 109,692
5 Claims. (Cl. 204—157)

This invention relates to a process for removing hydrogen from chlorine gas produced by the electrolytic decomposition of alkali metal salts such as sodium chloride, potassium chloride and the like.

Chlorine gas produced by the electrolysis of alkali metal salts using, for example, a mercury cathode and graphite anodes, often contains minor amounts, for example, from about 0.5% to about 2% or more of hydrogen as an impurity. Upon liquefaction of the chlorine, the percentage of hydrogen vented in the tail gases is correspondingly increased to an extent such that its concentration is in the highly explosive or detonable region. Hence, its removal prior to the liquefaction stage is desirable. The exact concentration which may give rise to explosions depends somewhat on the liquefaction conditions. In general, it is believed that hydrogen concentrations at the input to the liquefaction stage should not exceed about 0.5% and preferably should be below about 0.2% by volume.

It is known that hydrogen, present in small quantities in chlorine gas, can be made to combine with chlorine by irradiating the gas stream with ultraviolet light. It is also known that the presence of oxygen in such chlorine gas in addition to hydrogen, tends to inhibit the chlorine-hydrogen reaction, and moreover to give rise to the formation of oxy-acids of chlorine such as perchloric acid which are unstable and dangerous.

It is a primary object of the present invention, to provide a process for removing substantially all the hydrogen from chlorine gas containing hydrogen as an impurity together with small quantities of oxygen.

A further object of the invention is to provide a process for reducing the hydrogen content of chlorine cell gas to a quantity which will minimize or obviate the danger of explosion when the chlorine gas is subjected to liquefaction.

Other objects will appear hereinafter.

These and other objects are accomplished according to our invention wherein electrolytic chlorine gas containing at least about 80% chlorine, together with between about 0.3% and 4% hydrogen and between about 0.1% and about 5% of oxygen by volume (as measured by Orsat analysis) is irradiated with ultraviolet light of wave lengths of 3200–4000 Angstrom units, preferably between about 3400 A. and about 3600 A. at a radiation intensity of at least about 4 watts per square foot of reactor area irradiated, at a temperature between about 75° C. and about 125° C. for a time sufficient to convert a major proportion of the hydrogen in the gas to hydrogen chloride to leave not more than about 0.5% hydrogen and preferably not more than 0.2% in the mixture.

In carrying out the process of our invention, any suitable apparatus may be employed which provides the critical conditions required for adequate hydrogen conversion. The apparatus shown somewhat schematically in the accompanying drawing illustrates a satisfactory arrangement for carrying out our process.

In the drawing, the numeral 1 represents a gas-tight reactor of glass such as Pyrex or other glass capable of passing ultraviolet radiation. Spaced about the reactor at a distance from its periphery of not more than about two inches, are one or more ultraviolet lamps or "Blacklights" 2. The reactor 1 is connected with a supply of electrolytic chlorine gas by pipe 3, connected to heating chamber 5, rotameter 6, and pipes 7 and 8 between the latter of which is located trap 10 connected to a drain pipe 11. A diaphragm control valve 9 is located in pipe 8. Connected to reactor 1 is exit column 12, leading through safety leg 15 and valve 13, to HCl scrubbers and chlorine liquefier (not shown).

Input and output gas sampling probes 16 and 17, respectively, may be inserted through fittings above and below the reactor, extending into the gas stream to obtain gas samples for analysis of gas compositions at these points.

Thermocouples for measuring and controlling temperature of the reaction gas are shown at a number of locations including TC–1 in pipe 7 at the point of input of the gas to the rotameter; TC–2 at the wall of rotameter 6; at TC–3 in pipe 3 at the input to the reactor with its thermocouple at 20; at TC–4 in the reactor effluent gas with its thermocouple at 21; and at TC–5 in the incoming cell gas from the electrolytic cell in pipe 8. The thermocouples may conveniently be connected to a temperature recorder (not shown) whose chart then gives a permanent temperature record of the reaction.

Heating means for raising the temperature of incoming gas is shown in the form of electrical heating tapes 21 and 22, but other conventional means may be employed if needed.

The dimensions of the reactor may vary with the amount of chlorine gas to be treated, and the rate at which the treatment is to be carried out. We have found that a cylindrical reactor having a 4″ diameter and length of about one foot, surrounded by 8 "Blacklights" will usually effect removal of at least about 95% of the hydrogen present in the cell gas in about 4 seconds residence time at about 100° C. A 2 inch diameter reactor and also a 1 inch diameter reactor have also been found satisfactory. For these smaller reactors, throughput per hour, of course, will be less and fewer ultraviolet lamps are required.

Reactors of diameters up to about 6 inches may be used, if desired, but may require adjustments in residence time and the provision for turbulence to insure irradiation of all portions of the gas stream as it passes through the reactor.

Depending on the size of the installation, longer reactors or parallel batteries of reactors may be used if desired.

In general, the cell gas treated will contain at least about 80% chlorine, usually about 95% or more by volume as measured at 25° C., together with proportions of hydrogen of at least about 0.3% and up to the explosive limit of about 4%, usually between about 0.8% and about 2%, and oxygen in proportions of at least about 0.1%, usually between about 0.3% and about 5%, the remainder inert gases such as carbon dioxide, usually in amounts between about 0.2% and about 1%, and nitrogen.

In a typical operation, electrolytic cell gas containing a major proportion of chlorine and minor amounts of impurities including hydrogen and oxygen is led from the cell through valve 9 into pipe 8, thence through trap 10 into electrically heated pipe 7 wherein the temperature of the gas is maintained at 75–80° C., thence through rotameter 6 and through heated pipe 5 where the gas is maintained at reaction temperature of between about 75° C. and about 125° C. The heated gas then passes into reactor 1, at a rate to assure the desired residence time exposed to ultraviolet lights 2, thence out through exit column 12 and through safety leg 15 to scrubbers (not shown) wherein HCl is removed by scrubbing with water, thence to the chlorine liquefier (not shown).

It is important that the temperature of the chlorine gas be maintained at a value of at least about 75° C. during its irradiation with ultraviolet light, preferably at temperatures between about 90° C. and about 125° C. in order to diminish the inhibiting effect of oxygen on the chlorine-hydrogen reaction which is manifested at lower temperatures. These temperatures provide practical reaction rates and also prevent the formation of oxy-acids of chlorine which tend to form at the lower temperatures. Temperatures higher than about 125° C. are unsatisfactory because of danger to, or weakness of common materials of construction used to conduct wet chlorine gas.

The ultraviolet light source should be as close as practicable to the chlorine in the reactor. A reflector may be provided behind the lights to concentrate substantially all of the radiant energy upon the chlorine in the reactor.

The number and distance from the reactor of the ultraviolet light sources should be such as to deliver at the surface of the reactor, radiant energy in the 3200–4000 Angstrom unit range amounting to at least about 4 watts, preferably between about 4 watts and about 50 watts per square foot of reactor area, about 10 watts per square foot representing a reasonable balance between efficiency of the conversion and cost of radiant energy. Reactors having parallel illuminated sides spaced 2 to 4 inches apart or tubular reactors of 3 to 6 inch diameters are satisfactory. The gas flow rate should be controlled to provide the required degree of illumination, which is dependent on time, intensity and wave length.

Suitable ultraviolet irradiation may be obtained by use of 15 watt mercury-arc lamps emitting in the ultraviolet range or by the so-called "Blacklights" (which are rated as 15 watt bulbs with about 40% efficiency thus delivering about 6 watts), which provide the required wattage and a major irradiation output between 3200–4000 A., preferably with a maximum at about 3400–3600 A., which is close to the chlorine absorption peak, or by other source of radiation delivering at least about 4 watts of radiation in the indicated wave length range. The reactor is suitably made of "Pyrex" or any glass transmitting wave lengths in the indicated range.

Arrangement of four of these lamps equally spaced around a 2 inch diameter by 1 foot length reactor at a distance of about 1 inch from its surface with no reflector provides about the optimum radiant energy at the surface of the reactor of about 10 watts per square foot of surface. Using a 4 inch reactor 8 such lamps equally spaced about the reactor at a distance of 1 inch from its surface provide substantially the same radiant energy, i.e. about 10 watts per square foot of surface irradiated.

Thus, depending on the size of the reactor, larger or smaller numbers of lights may be used to obtain the optimum intensity of irradiation. Alternately, lights of different sizes, and of different radiation characteristics may be used, provided sufficient energy in the spectral region, 3400–3600 A., is emitted.

The time of irradiation will vary somewhat with the temperature and the intensity of the radiation used and with the percentage of hydrogen in the mixture. However, we find in general that periods between about 1 second and about 10 seconds are usually sufficient for conversion of between about 50% and about 97% of the hydrogen originally in the cell gas to hydrogen chloride. Longer residence times and/or higher temperatures, and/or greater irradiation intensity are required for higher conversions.

In any event, irradiation should be continued until the treated chlorine gas contains less than about 0.5% of hydrogen by volume in order to prevent the formation of detonable mixtures in the liquefier tail gas, preferably until the hydrogen content has been reduced to about 0.2% or less.

Intensity of irradiation is important, in providing an adequate reaction velocity for practical operation, and should be such as to provide a reaction velocity constant, $k$, of at least 0.25 sec.$^{-1}$ and preferably about 0.5 sec.$^{-1}$. This constant $k$ varies with temperature, the number and arrangement of the lamps and the design of the reactor.

Assuming that the hydrogen-chlorine reaction is first order, at least with respect to hydrogen, then the rate constant $k$ can be computed for the various operating conditions.

The velocity constant for a first order reaction is defined as $$k = \frac{1}{t} \ln \frac{a}{a-x} = -\frac{1}{t} \ln \frac{a-x}{a} \quad (1)$$

where, for the case at hand, $t$ = time in seconds
$a$ = % $H_2$ in input gas
$x$ = % $H_2$ in output gas Let, $$P = \frac{a-x}{a}$$

which is the fraction of hydrogen not reacted.
Then, $$k = -\frac{\ln P}{t} \quad (2)$$

Values of $P$ for the 4" reactor gives values of $k$ for 3 temperatures (90°, 100° and 110° C.) with 2, 4 and 8 lights which vary as shown in Equations (4), (5) and (6) below.

The variation of $k$ with temperature can be expressed as $$\log k = a + b/T \quad (3)$$

where $a$ and $b$ are constants and $T$ is absolute temperature. Plotting log $k$ against $1/T$ gives a straight line. The best line for the data is obtained by the method of least squares. Applying this method to the data of Examples 1–10 (Table I) for the 4" reactor, the following equations were derived for equation 3:

Using 2 lights: log $k_2$ = 3.5950 − 1552.14/$T$      (4)
Using 4 lights: log $k_4$ = 3.8336 − 1537.73/$T$      (5)
Using 8 lights: log $k_8$ = 3.917 − 1545/$T$.      (6)

The standard deviations for the calculated $k$'s for these equations are: for $k_2$, 0.025; for $k_4$, 0.057; and for $k_8$, 0.068.

The slope of the above lines gives the activation energy for the reaction, by the equation $$E = 2.303Rb \quad (7)$$

where $R$ = 1.987 calories/degree/mol
$b$ = slope of lines in Equations (3), (4), (5) and (6)
    = 1545 (average value)

For the above equations the average value of $E$ is about 7000 calories per mol.

The following specific examples further illustrate our invention:

EXAMPLES 1–10

A series of examples was run using equipment similar to that illustrated in the drawings. In these tests chlorine cell gas prepared by electrolytic decomposition of sodium chloride having the compositions shown in the following Table I, wherein any balance is nitrogen or other inert gas, was passed through a polyvinyl chloride pipe to the diaphragm valve 9 into Pyrex glass piping, then through the heated section of the pipe where the temperature was raised to the desired reaction temperature, thence downwardly through a 4" diameter, 3 ft. long Pyrex glass reactor column with 1 ft. exposed to and surrounded by the indicated number of 15 watt "Blacklights," each positioned 1 inch from the reactor surface. The gas passed through the reactor at a rate to provide the indicated residence times, thence across and up the safety leg 15 and down the exit column, thence to scrubbing towers where HCl formed in the tests was removed by scrubbing with water.

Temperatures were measured with thermocouples at the various points indicated in the drawing, i.e. TC-1, input gas to rotameter; TC-2, wall of rotameter; TC-3, input to reactor; TC-4, reacted gas and TC-5 incoming cell gas. The thermocouples were connected to a temperature recorder whose chart gave a permanent temperature record of each test.

Conditions used in the several tests, and results obtained in terms of hydrogen removal and final composition of the gas in percentages by volume at 25° C. are shown in Table I below.

of irradiation in such a manner that the value of $k$ is at least about 0.25 sec.$^{-1}$. Data in Table II indicate that values of $k$ of about 3.2 sec.$^{-1}$ are necessary to approach 100% conversion of hydrogen. Inasmuch as values of $k$ in excess of 3.2 may be used, reaction rates of such magnitude are not economically rewarding, since the rate of increase of the reactivity of the hydrogen decreases asymptotically as one approaches 100% conversion. Consequently, for commercial purposes, it is not necessary nor desirable to achieve this degree of conversion, removal of up to about 97% of the hydrogen being amply sufficient in most cases.

EXAMPLES 11-19

A series of runs was made in a manner similar to that described for Examples 1-10 above except that a 2 inch diameter reactor was used instead of a 4 inch diameter reactor.

Conditions and results are shown in Table II below.

*Table I*

| Example No. | No. of Lights | Reactor Temp., °C. | CFM* at t° | Residence Time, sec. | H₂ Removal | | | K | Gas Composition | | | | | |
|---|---|---|---|---|---|---|---|---|---|---|---|---|---|---|
| | | | | | H₂ conc., percent | | Percent Removed | | Percent Cl₂ | | Percent O₂ | | Percent CO₂ | |
| | | | | | Input | Output | | | Input | Output | Input | Output | Input | Output |
| 1a | 4 | 89 | 1.05 | 5.00 | 0.94 | 0.10 | 89.4 | 0.449 | 96.6 | 97.5 | 0.47 | 0.46 | 0.38 | 0.24 |
| 1b | 4 | 91 | 2.0 | 2.62 | 0.94 | 0.37 | 60.6 | 0.355 | 96.6 | 96.9 | 0.47 | 0.53 | 0.38 | 0.28 |
| 2a | 4 | 102 | 1.09 | 4.80 | 0.95 | 0.06 | 93.7 | 0.576 | 96.1 | 97.2 | 0.59 | 0.57 | 0.27 | 0.23 |
| 2b | 4 | 106 | 1.10 | 4.76 | 0.95 | 0.06 | 93.7 | 0.581 | 96.2 | 96.3 | 0.54 | 0.74 | 0.31 | 0.53 |
| 2c | 4 | 105 | 1.10 | 4.76 | 1.02 | 0.05 | 95.1 | 0.634 | 95.4 | 96.4 | 0.68 | 0.65 | 0.52 | 0.59 |
| 3a | 8 | 98 | 2.03 | 2.58 | 1.04 | 0.23 | 77.9 | 0.585 | 94.0 | 94.6 | 0.99 | 0.99 | 0.48 | 0.53 |
| 3b | 8 | 101 | 2.03 | 2.58 | 1.13 | 0.24 | 78.8 | 0.601 | 95.4 | 96.1 | 0.64 | 0.66 | 0.58 | 0.55 |
| 4a | 8 | 102 | 2.04 | 2.57 | 1.06 | 0.19 | 82.1 | 0.669 | 93.8 | 95.4 | 0.98 | 0.84 | 0.61 | 0.57 |
| 4b | 8 | 104 | 2.05 | 2.55 | 1.13 | 0.26 | 77.0 | 0.576 | 95.3 | 96.4 | 0.69 | 0.68 | 0.43 | 0.31 |
| 4c | 4 | 101 | 2.03 | 2.58 | 1.12 | 0.27 | 75.9 | 0.552 | 95.8 | 96.9 | 0.63 | 0.54 | 0.42 | 0.43 |
| 5a | 8 | 111 | 2.09 | 2.51 | 1.47 | 0.18 | 87.8 | 0.838 | 97.0 | 97.9 | 0.29 | 0.37 | 0.39 | 0.44 |
| 5b | 4 | 112 | 2.09 | 2.51 | 1.24 | 0.28 | 77.4 | 0.592 | 97.2 | 98.0 | 0.26 | 0.33 | 0.45 | 0.44 |
| 5c | 2 | 110 | 2.08 | 2.52 | 1.34 | 0.59 | 56.0 | 0.326 | 96.6 | 97.2 | 0.39 | 0.47 | 0.36 | 0.29 |
| 6a | 8 | 108 | 1.29 | 4.06 | 1.63 | 0.05 | 96.9 | 0.856 | 94.9 | 96.8 | 0.70 | 0.60 | 0.59 | 0.55 |
| 6b | 4 | 110 | 1.30 | 4.03 | 1.64 | 0.09 | 94.5 | 0.720 | 94.6 | 96.2 | 0.79 | 0.70 | 0.62 | 0.68 |
| 6c | 2 | 112 | 1.31 | 4.00 | 1.43 | 0.31 | 78.3 | 0.382 | 94.8 | 96.8 | 0.77 | 0.55 | 0.52 | 0.51 |
| 7a | 8 | 90 | 1.97 | 2.66 | 1.34 | 0.48 | 64.2 | 0.386 | 95.7 | 96.6 | 0.56 | 0.58 | 0.46 | 0.44 |
| 7b | 4 | 91 | 1.98 | 2.64 | 1.71 | 0.69 | 59.6 | 0.343 | 95.8 | 97.2 | 0.45 | 0.41 | 0.49 | 0.32 |
| 7c | 2 | 88 | 1.96 | 2.67 | 1.34 | 0.83 | 38.1 | 0.180 | 96.0 | 96.4 | 0.53 | 0.52 | 0.50 | 0.49 |
| 8a | 8 | 92 | 1.06 | 4.94 | 1.51 | 0.15 | 90.1 | 0.468 | 96.1 | 97.9 | 0.41 | 0.34 | 0.64 | 0.41 |
| 8b | 4 | 90 | 1.05 | 5.00 | 1.22 | 0.15 | 87.7 | 0.419 | 96.0 | 97.1 | 0.86 | 0.56 | 0.32 | 0.30 |
| 8c | 2 | 92 | 1.06 | 4.94 | 1.50 | 0.44 | 70.7 | 0.248 | 95.1 | 97.2 | 0.65 | 0.45 | 0.68 | 0.47 |
| 9 | 4 | 110 | 1.30 | 4.03 | 1.36 | 0.08 | 94.1 | 0.702 | 95.5 | 96.5 | 0.30 | 0.32 | 0.87 | 0.91 |
| 10 | 8 | 101 | 1.26 | 4.2 | 1.61 | 0.12 | 92.5 | 0.617 | 96.6 | 97.1 | 0.35 | 0.40 | 0.37 | 0.92 |

*Cubic feet per minute of crude chlorine gas.

It will be noted from Table I above that to obtain at least about 50% conversion of hydrogen, it is necessary to adjust conditions of temperature, time and intensity

*Table II*

| Example No. | No. of Lights | Reactor Temp., °C. | CFM at t° | Residence Time, sec. | H₂ Removal | | | K | Gas Composition | | | | | |
|---|---|---|---|---|---|---|---|---|---|---|---|---|---|---|
| | | | | | H₂ conc., percent | | Percent Removed | | Percent Cl₂ | | Percent O₂ | | Percent CO₂ | |
| | | | | | Input | Output | | | Input | Output | Input | Output | Input | Output |
| 11a | 2 | 95 | 0.88 | 1.49 | 0.90 | 0.27 | 70.0 | 0.808 | 97.0 | 97.7 | 0.41 | 0.39 | 0.25 | 0.24 |
| 11b | 4 | 110 | 0.91 | 1.44 | *0.96 | 0.00 | 100.0 | 3.198 | | 98.1 | | 0.33 | | 0.30 |
| 11c | 1 | 110 | 0.89 | 1.47 | 1.03 | 0.51 | 50.5 | 0.488 | 96.5 | 97.4 | 0.44 | 0.36 | 0.54 | 0.45 |
| 12a | 1 | 99 | 1.08 | 1.21 | 0.90 | 0.50 | 44.4 | 0.485 | 95.9 | 95.7 | 0.64 | 0.80 | 0.35 | 0.37 |
| 12b | 2 | 108 | 1.11 | 1.18 | 0.87 | 0.30 | 65.5 | 0.902 | 95.4 | 96.2 | 0.70 | 0.70 | 0.73 | 0.46 |
| 12c | 4 | 109 | 1.11 | 1.18 | 0.95 | 0.18 | 81.1 | 1.412 | 95.7 | 96.2 | 0.60 | 0.66 | 0.51 | 0.57 |
| 13a | 4 | 98 | 0.89 | 1.47 | 0.92 | 0.12 | 87.0 | 1.388 | 96.6 | 97.5 | 0.49 | 0.47 | 0.41 | 0.40 |
| 13b | 4 | 114 | 0.92 | 1.42 | 0.81 | 0.04 | 95.1 | 2.124 | 96.3 | 97.0 | 0.51 | 0.52 | 0.61 | 0.69 |
| 14a | 4 | 104 | 1.4 | 0.93 | 1.43 | 0.43 | 70.0 | 1.295 | 96.2 | 97.6 | 0.45 | 0.38 | 0.55 | 0.42 |
| 14b | 4 | 102 | 1.4 | 0.93 | *1.42 | 0.53 | 62.7 | 1.060 | | 97.3 | | 0.63 | | 0.45 |
| 14c | 4 | 116 | 1.45 | 0.90 | 1.41 | 0.31 | 78.0 | 1.682 | 96.0 | 97.5 | 0.50 | 0.43 | 0.64 | 0.39 |
| 15a | 4 | 101 | 0.97 | 1.35 | 1.21 | 0.22 | 81.8 | 1.262 | 97.2 | 98.4 | 0.30 | 0.26 | 0.48 | 0.33 |
| 15b | 4 | 96 | 0.95 | 1.38 | 1.47 | 0.10 | 93.2 | 1.948 | 96.6 | 97.5 | 0.46 | 0.45 | 0.64 | 0.53 |
| 16a | 4 | 108 | 1.1 | 1.2 | 1.42 | 0.30 | 79.0 | 1.301 | 96.1 | 97.1 | 0.47 | 0.49 | 0.52 | 0.52 |
| 16b | 4 | 107 | 1.1 | 1.2 | 1.80 | 0.35 | 80.6 | 1.367 | 95.9 | 97.6 | 0.43 | 0.36 | 0.55 | 0.54 |
| 17a | 4 | 102 | 1.09 | 1.20 | 1.60 | 0.33 | 79.4 | 1.317 | 94.2 | 95.0 | 0.84 | 0.98 | 0.45 | 0.50 |
| 17b | 4 | 121 | 1.14 | 1.15 | 1.22 | 0.15 | 87.7 | 1.823 | 96.1 | 97.4 | 0.51 | 0.44 | 0.34 | 0.40 |
| 17c | 4 | 117 | 1.13 | 1.16 | 1.30 | 0.25 | 80.8 | 1.422 | 96.4 | 97.8 | 0.47 | 0.34 | 0.42 | 0.51 |
| 18a | 4 | 118 | 2.14 | 0.61 | 0.81 | 0.34 | 58.0 | 1.423 | 96.7 | 96.9 | 0.50 | 0.55 | 0.58 | 0.71 |
| 18b | 4 | 118 | 2.24 | 0.60 | 0.88 | 0.44 | 50.0 | 1.155 | 96.2 | 96.5 | 0.36 | 0.53 | 0.44 | 0.42 |
| 19a | 4 | 122 | 0.94 | 1.40 | 0.78 | 0.06 | 92.3 | 1.831 | 95.2 | 96.7 | 0.80 | 0.69 | 0.49 | 0.31 |
| 19b | 4 | 119 | 0.94 | 1.40 | 0.99 | 0.14 | 86.0 | 1.404 | 95.2 | 96.3 | 0.74 | 0.70 | 0.42 | 0.32 |

*No input gas sample taken with corresponding output sample. Input percent H₂ given is average of the "a" and "c" samples.

Our invention thus provides a useful and advantageous means for eliminating or reducing the hydrogen content of chlorine cell gas, thus eliminating the danger of explosions when this gas is subsequently liquefied.

While the above describes the preferred embodiments of our invention it will be understood that departures may be made therefrom within the scope of the specification and claims.

We claim:

1. The process for removing hydrogen from impure chlorine gas containing, in proportions by volume on a dry basis at least about 80% chlorine, between about 0.3% and 4% hydrogen, between about 0.1% and about 5% oxygen, the balance inert gases, which comprises subjecting said chlorine gas to irradiation with ultraviolet light of wave lengths between about 3200 Angstrom units and about 4000 Angstrom units at a radiation intensity of at least about 4 watts per square foot of reactor irradiated, at temperatures between about 75° C. and about 125° C. for a residence time not greater than about 10 seconds sufficient to reduce the hydrogen content of the gas to below about 0.5% by volume.

2. The process according to claim 1 wherein the chlorine gas is obtained by the electrolysis of an alkali chloride and contains at least about 80% chlorine, between about 1% and about 2% hydrogen, between about 0.1% and about 5% oxygen and the balance is composed essentially of carbon dioxide and nitrogen.

3. The process according to claim 1 wherein the residence time under temperature specified and radiation with between about 4 watts and about 50 watts per square foot of reactor irradiated, is between about 1 second and about 10 seconds.

4. The process according to claim 1 wherein the temperature, time and radiation conditions are coordinated to provide a reaction velocity constant K between about 0.5 and about 3.2 sec.$^{-1}$.

5. The process according to claim 2, wherein the chlorine gas flowing through a glass reactor transparent to light of wave lengths between about 3200 Angstroms and about 4000 Angstroms, is irradiated at said wave lengths by means of a plurality of ultraviolet-emitting lamps spaced about the periphery of said reactor, said irradiation occurring at temperatures between about 100° C. and about 110° C. for a period between about 2 seconds and about 4 seconds.

References Cited by the Examiner

UNITED STATES PATENTS

| | | | |
|---|---|---|---|
| 2,705,219 | 3/55 | Heiskell et al. | 204—157 |
| 2,850,640 | 9/58 | Dudley et al. | 204—157 |

JOHN H. MACK, *Primary Examiner.*

JOHN R. SPECK, WINSTON A. DOUGLAS, *Examiners.*